Patented July 29, 1947

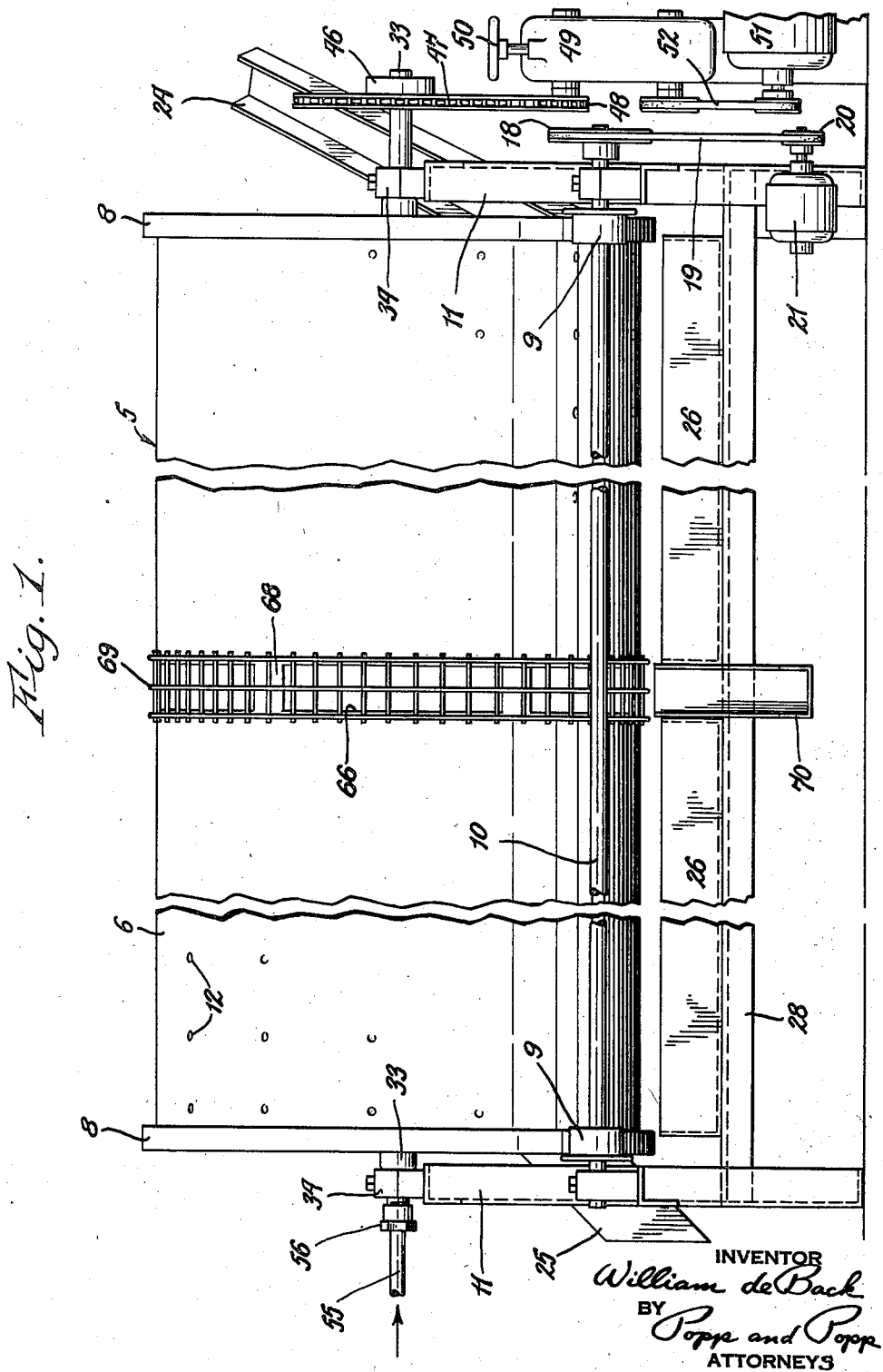

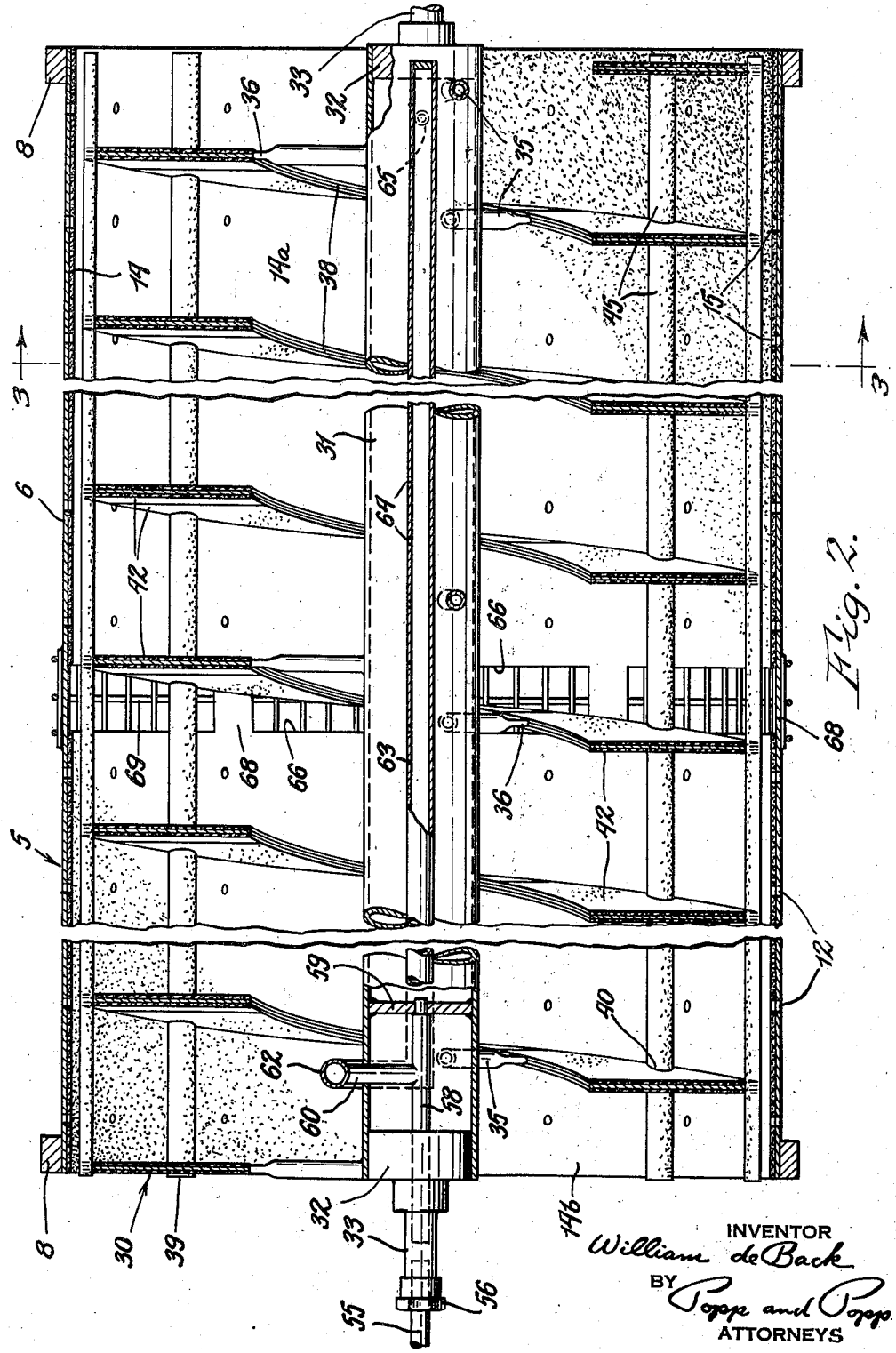

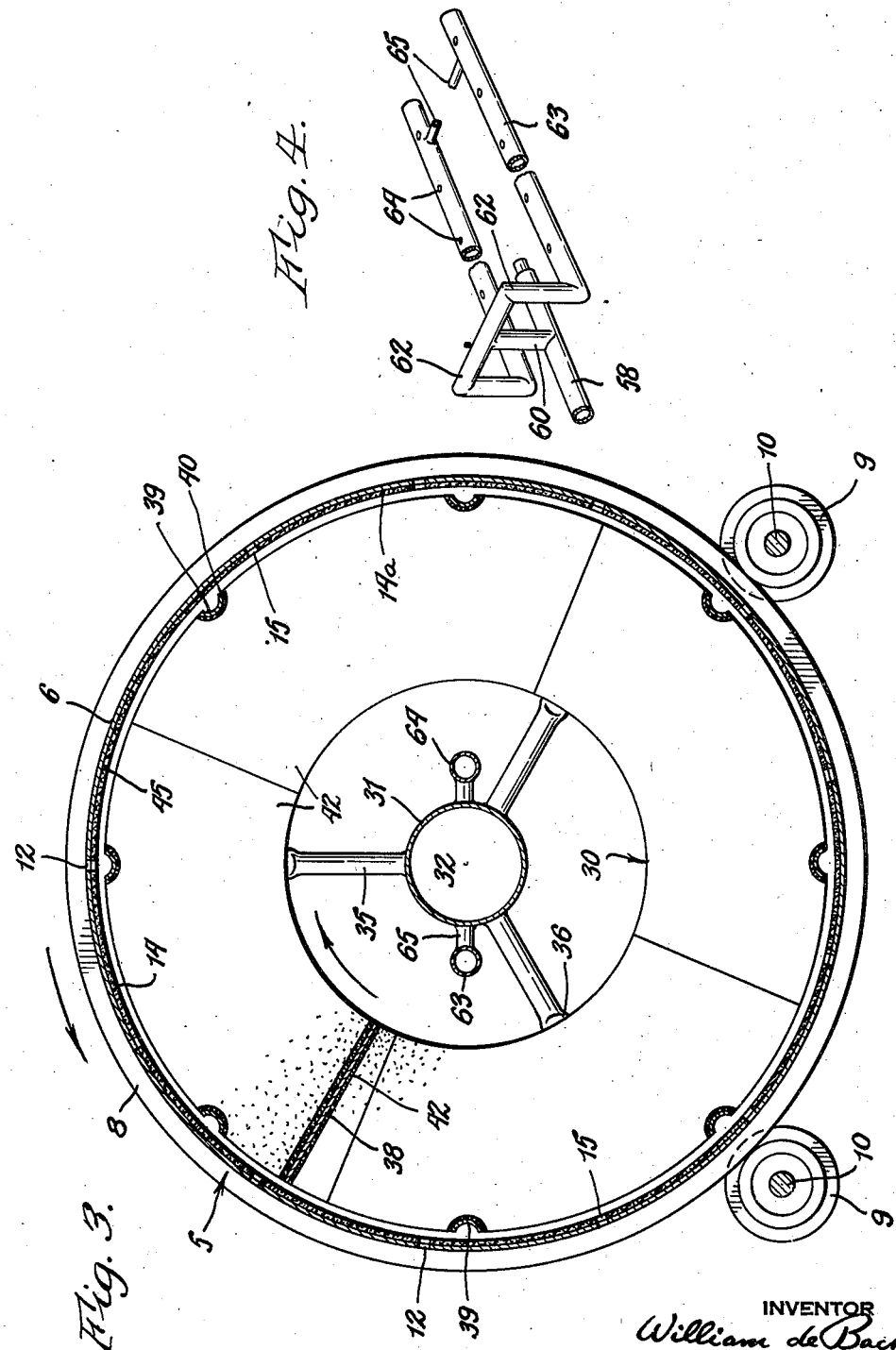

2,424,803

UNITED STATES PATENT OFFICE 2,424,803

HORIZONTAL ROTARY ABRADING DRUM FOR PEELING FRUIT AND VEGETABLES

William de Back, Niagara Falls, N. Y., assignor to Chisholm-Ryder Company, Incorporated, Niagara Falls, N. Y., a corporation of New York Application April 21, 1944, Serial No. 532,132

4 Claims. (Cl. 146—49)

This invention relates to apparatus for peeling fruit and vegetables and more particularly to such peeling which is effected by abrasion.

One of the objects of the present invention is to provide such apparatus for the abrasive peeling of fruit and vegetables in which the fruit or vegetables are peeled to a uniform depth on all surfaces thereof, the fruit or vegetables being constantly turned and agitated while subjected to abrasive peeling so as to uniformly present all surfaces to the abrasive surface.

Another object of the invention is to provide such apparatus in which the operation is continuous, that is, in which a stream of the articles to be peeled are fed in at one end of the apparatus and a stream of the peeled articles removed from the opposite end thereof.

Another aim is to provide such apparatus which can readily be adjusted to remove exactly the amount of peel desired thereby to permit of peeling articles, such as citrus fruit exactly to the meat without rupturing the membrane which encloses the several segments thereof.

Another object is to provide such apparatus which is applicable to any type of surface, such as the hard surfaces of raw potatoes and the rind and rag of the peel of citrus fruit which is soft especially after having been treated in sodium hydroxide or other agents to soften the rag.

Another purpose is to provide such apparatus in which the abrasive surface will not foul or fill up in use, the abrasive surface being constantly kept in a sharp operative condition regardless of the type of peeling being done.

Another object is to provide such apparatus in which the foodstuffs being peeled are kept in a clean, sanitary and marketable condition while being subjected to abrasive peeling.

Another purpose is to provide such apparatus in which the articles are thoroughly washed while being peeled.

Another aim is to provide such apparatus in which the abrasive surfaces will operate at full efficiency for a long time under hard usage but can readily be replaced when worn beyond usefulness.

Another object is to provide such apparatus in which small sized vegetables or fruit are subjected to abrasive peeling for a shorter length of time than larger fruit or vegetables thereby to avoid waste.

Another object is to provide such apparatus in which the fruit or vegetables can be successively subjected to coarse and fine abrasive peeling in any order desired.

Another object is to provide such apparatus which is readily washed and kept in a clean and sanitary condition.

Another object is to provide such apparatus which is simple and inexpensive in construction and which will stand up under conditions of severe and constant use without getting out of order or requiring repairs.

In the accompanying drawings:

Fig. 1 is a fragmentary side elevational view of an abrasive peeler embodying and adapted to carry out the present invention.

Fig. 2 is a vertical fragmentary longitudinal central section through the same.

Fig. 3 is a transverse section taken on line 3—3, Fig. 2.

Fig. 4 is a fragmentary perspective view of the piping for supplying wash water to the apparatus.

The apparatus embodying the present invention is shown as including an open ended drum 5 mounted to rotate about a generally horizontal axis. This drum is shown as having a tubular body 6 of sheet metal and provided at its ends with end rings 8, these end rings being mounted on flanged rollers 9 fast to drive shafts 10 which extend lengthwise of the drum along opposite sides thereof. Each of these shafts 10 is journaled at its ends in end heads 11 of the supporting frame for the apparatus.

The tubular body 6 of the drum is perforated at regular intervals, as indicated at 12, the purpose of these perforations being to permit the direct escape of wash water and removed peel from the drum. This tubular body 6 is also provided with a removable lining 14 of abrasive material. This abrasive lining can be of any suitable form, preferably in the form of sheets or strips which are impregnated or coated on their inner sides with particles of an abrasive material such as silicon carbide. These sheets or strips can be removably secured to the inside of the tubular body 6 adhesively or in any other suitable manner as by bolting. The lining 14 also is provided with holes 15 which register with the holes 12 of the tubular body 6 so as to permit the direct escape of wash water and debris.

The drum 5 is continuously rotated and for this purpose a pulley 18 is shown as mounted on one end of one of the shafts 10, this pulley being connected by a drive belt 19 with a pulley 20 on the shaft of an electric motor 21, this motor being suitably mounted on the corresponding end head 11.

The citrus fruit, potatoes, or the like are shown as being fed into one end of the drum 5 by an inlet chute 24 and as being discharged from the opposite end of this drum through an outlet chute 25. The debris removed from the fruit or vegetables passing through the drum 5, and escaping through the holes 12, 15 therethrough is caught in one or more pans or troughs 26 supported on longitudinal bars 28 connecting the end heads 11. The lining 14 of abrasive material can also be provided in different degrees of fineness in different parts of the drum. For example the abrasive lining 14a at the inlet end of the drum can be relatively coarse and the abrasive lining 14b at the outlet end of the drum can be relatively fine. By this means the rough outer part of the peel of the raw fruits and vegetables is quickly removed by the relatively coarse abrasive 14a whereas a finer finish abrasion is effected by the fine abrasive 14b thereby to leave the product in a more marketable condition.

Within the drum 5 is arranged a rotating helical conveyer, indicated generally at 30, which operates to convey the articles being peeled from the inlet to the outlet of the drum and also serves to agitate the articles so as to constantly present fresh faces to the abrasive surfaces of the conveyer and drum and thereby effect uniform peeling with a minimum of waste. Further, sprays are carried by the helical conveyer which serve to wash the articles while being peeled and also to wash away the debris occasioned by the abrasive peeling.

The rotating helical conveyer is shown as including a central tube or cylinder 31 arranged coaxially within and extending the full length of the drum 5. Each end of this central tube or cylinder is closed by an end head 32 which is extended to provide an axial spindle 33, these spindles being journaled in bearings 34 carried by the end heads 11 of the main frame.

Welded to the exterior of this central tube or cylinder 31, in helical order, is a series of radially projecting tubular arms 35 the outer ends 36 of which are flattened to extend transversely of the apparatus. To the flattened outer ends of these helically arranged arms are welded the several convolutions of a sheet metal helix 38. This helix extends from the inlet to the outlet end of the drum with its outer edge in close proximity to the interior face thereof. At spaced intervals around the helix 38 axially extending sheet metal channels or bars 39 are welded to the outer edges of the convolutions thereof. For this purpose each channel is preferably of rounding form in cross section and is welded in rounding recesses 40 provided in the convolutions of the helix. Each of these channels 39 extends axially the full length of the helix and is welded to each convolution and is arranged with its rounding face facing inwardly.

To provide additional abrasive effect, sheets 42 of abrasive material are secured to the opposite faces of each convolution of the helix 38. As with the lining 14 for the drum, the abrasive material, such as silicon carbide, can be impregnated in or coated on the sheets 42 and the sheets 42 are preferably removably secured to the helix so as to be replaceable when worn. For this purpose the sheets 42 can be adhesively secured to the helix 38 or they can be bolted or secured in any other suitable manner.

In a similar way a sheet 45 of abrasive material is preferably removably secured to the inner rounding face of each channel 39 between each convolution of the helix 38.

Means are provided for rotating the helix 38 at any desired speed determined by the character or condition of the particular fruit or vegetables being processed. For this purpose a sprocket 46 is shown as fast to one spindle 33 of the helical conveyer and as connected by a chain 47 with the sprocket 48 of a variable speed controller 49, the output speed of which is shown as regulated by means of a handwheel 50. The controller is driven by an electric motor 51 through a belt drive 52 or in any other suitable manner. To wash the articles while they are being peeled and also to wash away the debris resulting from the abrasive peeling, a stationary water supply pipe 55 extends axially into the bore of one of the spindles 33 of the helical conveyer, a gland or stuffing box 56 being provided to prevent the escape of water at the joint between the stationary water supply pipe 55 and the rotating spindle. In this bore is also fixed a short length of pipe 58 which rotates with the spindle and extends into the tube or cylinder 31, the other end of the pipe being suitably supported in a disk 59 secured in the adjacent end of the tube or cylinder. A branch 60 extends radially from the axial pipe 58 through an opening in the tube or cylinder 31 and, as best shown in Fig. 4, exteriorly of the tube or cylinder 31, the two L-shaped branch pipes 62 connect with the end of the radial pipe 60, these L-shaped pipes terminating in the same plane as the axial pipe 58. Horizontal spray pipes 63 connect with the end of the L-shaped branch pipes 62, these spray pipes being arranged parallel with the axis of rotation of the helical conveyer and on diametrically opposite sides of the central tube or cylinder 31 thereof. These spray pipes are provided with openings 64 through which water is sprayed into the interior of the drum 5, the spray pipes 63 extending substantially the full length of this drum, as best shown in Fig. 2. At suitable intervals the spray pipes 63 are connected to the central tube or cylinder 31 by short rods 65 welded thereto.

If the fruit or vegetables are not accurately graded as to size, it is desirable to subject the smaller sizes to a smaller amount of abrasive peeling. Thus with potatoes, for example, smaller potatoes are completely peeled before the larger ones are and hence the same treatment of both would result in a loss of a substantial amount of the edible portions of the smaller potatoes. To avoid this the drum 5 is shown as provided at a suitable distance from its inlet end with an annular series of circumferentially extending rectangular openings 66, the continuity of the cylinder 6 of the drum being preserved by bridge pieces 68 between these openings. A piece of wire cloth or screening 69 is wrapped around the drum 5 to cover these rectangular openings 66, this piece of wire cloth being welded or otherwise suitably secured to the shell 6 of the drum. The openings provided by the mesh of this piece of wire screening are of such size as to permit the escape of the smaller articles from the corresponding part of the drum, the articles larger than the mesh of the wire cloth 69 being retained in the drum and being subjected to abrasive peeling for the full length thereof. The smaller articles falling through the mesh of the wire cloth 69 are caught in a chute 70 as shown in Fig. 1.

In operation the fruit or vegetables to be peeled are being supplied in a steady stream from the inlet chute 24 to the leading convolution of the helix 38 of the conveyer 30. This helix 38 is connected by the helically arranged arms 35 with the central tube or cylinder 31, the end spindles of which are journaled on the end heads of the main frame. Through the motor 51, variable speed controller 49, chain 47 and sprocket 46 one of these spindles is rotated to rotate the helix 38 in the direction to carry the fruit or vegetables from the inlet to the outlet end of the drum 5, this being clockwise as viewed in Fig. 3.

The drum 5 is rotating in the opposite direction, or counterclockwise as viewed in Fig. 3. This opposite rotation of the drum 5 and helical conveyer 30 is an important feature of the invention since the axial channels 39 at the periphery of the helix 38 thereby travel in the opposite direction to the drum so that the movement of the articles along with the drum is constantly being interrupted and the articles are constantly being agitated and changed in positions so as to uniformly present all surfaces for abrasion.

The inside of the drum 5, the opposite sides of the helix 38, and the inner faces of the longitudinal channel bars 39 are all provided with removable lining strips of abrasive material and hence the articles being conveyed along the drum 5 by the helical conveyer 30 are subjected to the abrasive effect of the oppositely traveling faces of the drum and helical conveyer. Since the helix 38 is provided with the abrasive bars or channels 39 traveling close to the surface of the drum 5, the peeling of the fruit or vegetables is effected rapidly and within a minimum length of the drum 5. After being conveyed the full length of the abrasive drum 5 by the abrasive helix 38, the peeled fruit or vegetables are discharged through the end chute 25.

Water is supplied from the stationary pipe 55 into the axial pipe 58 fixed in one spindle 33 of the helical conveyer. Through the radial pipe 60 and L-shaped branch pipes 62 this water is conducted to the longitudinal spray pipes 63 which rotate with the helical conveyer. These spray pipes 63 spray the water over the fruit or vegetables passing through the cylinder 5 and hence wash the same and also wash away the debris resulting from the abrasion. This water and debris is carried through the holes 12 and 15 of the drum cylinder and its abrasive lining strips and is collected in troughs or pans 26 arranged under the drum.

The drum can be set to rotate at a constant speed and the extent of the peeling, to suit the character and condition of the fruit or vegetables to be peeled, can be adjusted by varying the speed of rotation of the helical conveyer 30. For this purpose this conveyer is driven through the variable speed controller 49. By rotating the helical conveyer faster the articles are carried through the drum more rapidly and hence less abrasive action or peeling takes place with the drum speed maintained constant. Through the variable speed controller 49, a very close and accurate control of the effective abrasion on the fruit or vegetables can be maintained.

The degree of initial abrasion and the condition of the surface of the final product can also be regulated by providing abrasive material of different degrees of coarseness in different zones of action of the apparatus. For example the strips of abrasive 14a at the inlet end of the drum can be relatively coarse to grate and rapidly remove the hard skin of the fruit or vegetables, whereas the strips of abrasive 14b at the outlet end of the drum can be relatively fine so as to leave the peeled fruit with a smooth surface.

If the articles handled are not accurately graded as to size, the drum 5 may be provided with the central annular series of rectangular openings 66 surrounded by the wire cloth 69. The smaller articles have been completely peeled on reaching this part of the drum and hence are permitted to fall through the mesh of the wire cloth 69 into the receiving chute 70. On the other hand the only partly peeled larger articles cannot pass the mesh of the wire cloth 69 and hence are required to pass the full length of the drum and be completely peeled.

From the foregoing it will be seen that the present invention provides an extremely simple apparatus for peeling fruit and vegetables which is subject to very accurate control to suit the character and condition of the articles being processed and which removes the desired peel to the exact extent desired with a minimum loss of the edible parts of the articles. Further the process is continuous and discharges the peeled articles in the most marketable condition and with the minimum requirement for further treatment to completely remove the peel or other parts of the fruit or vegetables.

I claim as my invention:

1. Apparatus for peeling the bodies of fruit and vegetables, comprising a horizontally disposed cylinder, means providing an abrasive surface on the interior of said cylinder, means rotating said cylinder in one direction, a helical conveyer arranged coaxially within said cylinder with the outer edges of its convolutions arranged in close proximity to said abrasive surface, a plurality of bars connecting the outer edges of the convolutions of said helical conveyer and extending axially thereof, means rotating said helical conveyer in a direction opposite to the direction of rotation of said cylinder to move said bars along said abrasive surface under the bodies supported thereon and in a direction opposite to the direction of rotation of said abrasive surface, means for admitting the bodies to be peeled into the end of said cylinder at the leading end of said helical conveyer and means for discharging the peeled bodies from the opposite end of said cylinder.

2. Apparatus for peeling the bodies of fruit and vegetables, comprising a horizontally disposed cylinder, means providing an abrasive surface on the interior of said cylinder, means rotating said cylinder in one direction, a helical conveyer arranged coaxially within said cylinder with the outer edges of its convolutions arranged in close proximity to said abrasive surface, a plurality of bars connecting the outer edges of the convolutions of said helical conveyer and extending axially thereof, means rotating said helical conveyer in a direction opposite to the direction of rotation of said cylinder to move said bars along said abrasive surface under the bodies supported thereon and in a direction opposite to the direction of rotation of said abrasive surface, means for admitting the bodies to be peeled into the end of said cylinder at the leading end of said helical conveyer, means for discharging the peeled bodies from the opposite end of said cylinder and means providing abrasive surfaces on said bars and the convolutions of said helical conveyer.

3. Apparatus for peeling the bodies of fruit and vegetables, comprising a horizontally disposed foraminous cylinder, means providing an abrasive surface on the interior of said cylinder, means rotating said cylinder in one direction, a helical conveyer arranged coaxially within said cylinder with the outer edges of its convolutions arranged in close proximity to said abrasive surface, a plurality of bars connecting the outer edges of the convolutions of said helical conveyer and extending axially thereof, means rotating said helical conveyer in a direction opposite to the direction of rotation of said cylinder to move said bars along said abrasive surface under the bodies supported thereon and in a direction opposite to the direction of rotation of said abrasive surface, means for admitting the bodies to be peeled into the end of said cylinder at the leading end of said helical conveyer, means for discharging the peeled bodies from the opposite end of said cylinder and means spraying a liquid on the bodies being conveyed through said cylinder by said helical conveyer.

4. Apparatus for peeling the bodies of fruit and vegetables, comprising a horizontally disposed cylinder, means providing an abrasive surface on the interior of said cylinder, means rotating said cylinder in one direction, a helical conveyer arranged coaxially within said cylinder with the outer edges of its convolutions arranged in close proximity to said abrasive surface, means rotating said helical conveyer in a direction opposite to the direction of rotation of said cylinder, means for admitting the bodies to be peeled into the end of said cylinder at the leading end of said helical conveyer, means for discharging the peeled bodies from the opposite end of said cylinder and means for discharging peeled bodies which are smaller than a predetermined size from a central portion of said cylinder comprising an annular series of openings provided through said central portion of said cylinder around the circumference thereof, said openings being of a size to permit the escape of said peeled bodies which are smaller than said predetermined size and retaining peeled bodies of a larger size in the cylinder.

WILLIAM DE BACK.

REFERENCES CITED

The following references are of record in the file of this patent:

UNITED STATES PATENTS

| Number | Name | Date |
| --- | --- | --- |
| Re. 4,025 | Averell et al. | June 14, 1870 |
| 1,418,443 | Jagenburg | June 6, 1922 |
| 721,027 | Curtis | Feb. 17, 1903 |
| 1,902,506 | Johnston et al. | Mar. 21, 1933 |
| 1,508,345 | Lupo | Sept. 9, 1924 |
| 2,210,584 | Hileman et al. | Aug. 6, 1940 |
| 1,244,452 | Hamlin | Oct. 23, 1917 |
| 1,012,129 | Fast | Dec. 19, 1911 |

FOREIGN PATENTS

| Number | Country | Date |
| --- | --- | --- |
| 196,417 | Great Britain | Apr. 26, 1923 |
| 547,137 | Germany | 1932 |
| 627,220 | Germany | Mar. 11, 1936 |
| 196,417 | Great Britain | Apr. 26, 1928 |